United States Patent
Yao

(10) Patent No.: US 10,551,688 B2
(45) Date of Patent: Feb. 4, 2020

(54) ELECTRODE STRUCTURE AND LIQUID CRYSTAL DISPLAY PANEL

(71) Applicant: Shenzhen China Star Optoelectronics Technology Co., Ltd., Shenzhen (CN)

(72) Inventor: Xiaohui Yao, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/907,961

(22) PCT Filed: Nov. 10, 2015

(86) PCT No.: PCT/CN2015/094226
§ 371 (c)(1),
(2) Date: Feb. 14, 2018

(87) PCT Pub. No.: WO2017/063243
PCT Pub. Date: Apr. 20, 2017

(65) Prior Publication Data
US 2018/0157128 A1    Jun. 7, 2018

(30) Foreign Application Priority Data
Oct. 15, 2015 (CN) .......................... 2015 1 0663153

(51) Int. Cl.
*G02F 1/1343* (2006.01)
*G02F 1/1337* (2006.01)

(52) U.S. Cl.
CPC .. *G02F 1/134309* (2013.01); *G02F 1/133707* (2013.01); *G09G 2300/0439* (2013.01)

(58) Field of Classification Search
CPC ......... G02F 1/134309; G02F 1/133707; G09F 9/302; G09G 2300/0439
USPC ..................................................... 349/141
See application file for complete search history.

(56) References Cited

U.S. PATENT DOCUMENTS

| | | | | |
|---|---|---|---|---|
| 2011/0242443 A1* | 10/2011 | Choi | ........................ | C08G 8/12 349/38 |
| 2011/0317103 A1* | 12/2011 | Tseng | ................ | G02F 1/133514 349/106 |
| 2013/0010248 A1* | 1/2013 | Kang | ................ | G02F 1/133707 349/139 |

* cited by examiner

*Primary Examiner* — Nathanael R Briggs
*Assistant Examiner* — William D Peterson

(57) ABSTRACT

An electrode structure and a liquid crystal display panel are disclosed. The electrode structure comprises a first trunk electrode and a second trunk electrode, the first trunk electrode and the second trunk electrode intersecting with each other to form a trunk electrode intersecting point; and a plurality of branch electrodes, the branch electrodes being spaced from one another, and one end of each branch electrode being connected with at least one of the first trunk electrode and the second trunk electrode and forming a trunk-branch angle with a corresponding trunk electrode. The trunk-branch angles of the branch electrodes decrease gradually or increase gradually along a direction from the trunk electrode intersecting point to far therefrom. An electric field distribution in the electrode structure can be optimized, and an orientation of liquid crystal can be optimized accordingly. Therefore, a display performance of the liquid crystal display panel under a wide viewing angle can be improved, and an aperture ratio thereof can be maintained.

8 Claims, 3 Drawing Sheets

ELECTRODE STRUCTURE AND LIQUID CRYSTAL DISPLAY PANEL

CROSS REFERENCE TO RELATED APPLICATIONS

The present application claims the priority of Chinese patent application CN201510663153.9, entitled "Electrode Structure and Liquid Crystal Display Panel" and filed on Oct. 15, 2015, the entirety of which is incorporated herein by reference.

FIELD OF THE INVENTION

The present disclosure relates to the technical field of liquid crystal display, and particularly to an electrode structure and a liquid crystal display panel.

BACKGROUND OF THE INVENTION

With the development of Thin Film Transistor Liquid Crystal Display (TFT-LCD) and the progress of industrial technology, the manufacturing process of LCD is becoming increasingly mature, and the manufacturing cost thereof is becoming increasingly low. LCD has replaced cathode-ray tube display device and become a mainstream display device in this field.

High Vertical Alignment (HVA) liquid crystal display panel is one kind of Vertical Alignment (VA) liquid crystal display panel. In an HVA liquid crystal display panel, a liquid crystal layer with a certain pre-tilt angle is solidified on a surface of an alignment film through an optical alignment method, and thus traditional friction alignment technology can be omitted.

FIG. 1 schematically shows a structure of a pixel electrode of an HVA liquid crystal display panel in the prior art. It can be seen from FIG. 1 that, at present, the tradition HVA pixel electrode mainly comprises four regions. Two trunk electrodes 101 intersect with each other and are perpendicular to each other so as to form four domains. Each domain is provided with a plurality of branch electrodes 102 with an equal distance thereamong. The branch electrodes 102 have a same width, and each branch electrode 102 forms a 45° angle with a corresponding trunk electrode 101.

Since liquid crystal has different orientations when a panel is watched under different viewing angles, a color distortion would be resulted in when the panel is watched under a wide viewing angle. In order to solve the technical problem of color distortion when the panel is watched under a wide viewing angle, in the traditional HVA liquid crystal display panel, the pixel electrode is divided into eight regions (i.e., eight domains), wherein part of them are main domains, and the other part of them are sub domains. In this liquid crystal display panel, the technical problem of color distortion when the panel is watched under a wide viewing angle can be solved through regulating the voltage of two kinds of domains, and this display panel is generally call as a low color shift panel.

In a traditional low color shift display panel, the technical problem of color distortion when the panel is watched under a wide viewing angle can be solved. However, since in the liquid crystal display panel, the pixel electrode is divided into two kinds of domains, an aperture ratio of the panel would be reduced inevitably. Moreover, in this kind of liquid crystal display panel, an effective electric potential of liquid crystal in a sub domain would be reduced. As a result, a brightness of the sub domain would decreases, and a light transmittance of the panel would be adversely affected.

SUMMARY OF THE INVENTION

The present disclosure aims to eliminate the phenomenon of color distortion when a liquid crystal display panel is watched under a wide viewing angle and maintain an aperture ratio of the panel. In order to solve the aforesaid technical problem, the present disclosure provides an electrode structure of a liquid crystal display panel, which comprises:

a first trunk electrode and a second trunk electrode, the first trunk electrode and the second trunk electrode intersecting with each other to form a trunk electrode intersecting point; and a plurality of branch electrodes, the branch electrodes being spaced from one another, and one end of each branch electrode being connected with at least one of the first trunk electrode and the second trunk electrode and forming a trunk-branch angle with a corresponding trunk electrode, wherein the trunk-branch angles of the branch electrodes decrease gradually or increase gradually along a direction from the trunk electrode intersecting point to far therefrom.

According to one embodiment of the present disclosure, the first trunk electrode and/or the second trunk electrode have/has a same width at different positions thereof.

According to one embodiment of the present disclosure, the plurality of branch electrodes comprise four central branch electrodes which are respectively arranged at four domains formed by the first trunk electrode and the second trunk electrode intersecting with each other, and the trunk-branch angle of each central branch electrode is 45°.

According to one embodiment of the present disclosure, the branch electrodes are arranged symmetrical about the first trunk electrode and the second trunk electrode.

According to one embodiment of the present disclosure, the trunk-branch angles of the branch electrodes decrease gradually along a direction from the trunk electrode intersecting point to far therefrom.

According to one embodiment of the present disclosure, the plurality of branch electrodes have a same width.

According to one embodiment of the present disclosure, each branch electrode is a bar-shaped electrode and has a constant width at all positions thereof.

According to one embodiment of the present disclosure, the trunk-branch angles of the branch electrodes increase gradually along a direction from the trunk electrode intersecting point to far therefrom.

According to one embodiment of the present disclosure, a width of each branch electrode decreases gradually along a direction from the trunk electrode intersecting point to far therefrom.

The present disclosure further provides a liquid crystal display panel, which comprises an electrode with any one of the aforesaid structures.

According to the present disclosure, the electrode structure are arranged in a manner such that the branch electrodes at different positions form different trunk-branch angles with the corresponding trunk electrode, which is different from the traditional electrode structure with four domains in which the trunk-branch angles of all branch electrodes are all arranged as 45°. In this manner, an electric field distribution in the electrode can be optimized, and an orientation of liquid crystal can be optimized accordingly. Therefore, a display performance of the liquid crystal display panel under wide viewing angle can be improved, and an aperture ratio thereof can be maintained.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The drawings necessary for explaining the embodiments or the prior art are introduced briefly below to illustrate the technical solutions of the embodiments of the present disclosure or the prior art more clearly.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no structural conflict, all the technical features mentioned in all the embodiments may be combined together in any manner, and the technical solutions obtained in this manner all fall within the scope of the present disclosure.

Many specific details are illustrated hereinafter for providing a thorough understanding of the embodiments of the present disclosure. However, it is obvious for those skilled in the art that, the present disclosure can be implemented in other methods in addition to the details or specifics described herein.

In order to improve a display performance of a liquid crystal display panel under wide viewing angle and maintain an aperture ratio thereof, in an electrode structure according to the present disclosure, branch electrodes in four domains are arranged in a new manner.

Figure 1:
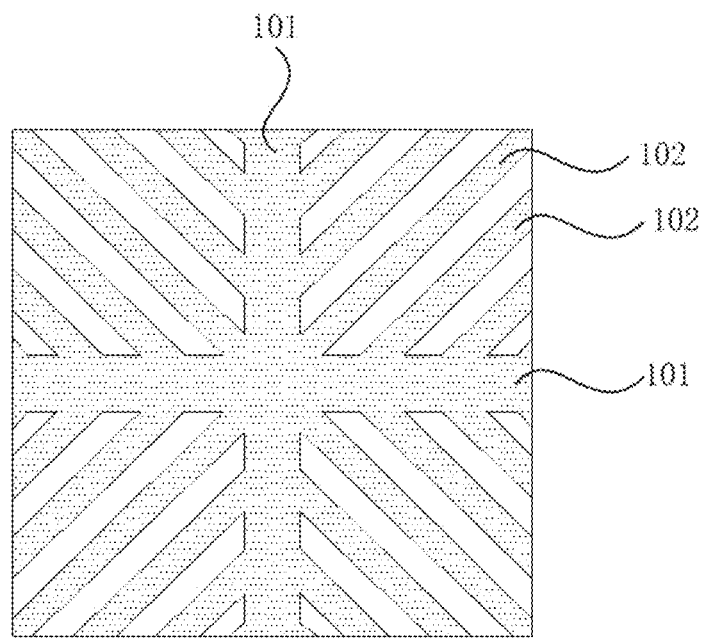
FIG. 1 schematically shows a structure of an HVA pixel electrode in the prior art.

As shown in FIG. 1, in a traditional pixel electrode structure with four domains, bar-shaped electrodes are arranged with an equal distance thereamong, and each branch electrode forms a 45° angle with a corresponding trunk electrode. In order to improve a display performance of the liquid crystal display panel under wide viewing angle and maintain an aperture ratio thereof, in an electrode structure according to the present disclosure, branch electrodes in four domains are arranged in a new manner. That is, the bar-shaped branch electrodes are arranged with unequal distances thereamong, or the bar-shaped branch electrodes are arranged with unequal widths at different positions thereof and are arranged in a radial shape. In this manner, an electric field distribution in the electrode structure can be optimized, and the orientation of the liquid crystal can be optimized accordingly. Therefore, a display performance of the liquid crystal display panel under wide viewing angle can be improved, and an aperture ratio thereof can be maintained.

The electrode structure according to the present disclosure will be further illustrated hereinafter with reference to different embodiments to make the principle and technical effect thereof more clear.

Embodiment 1

Figure 2:
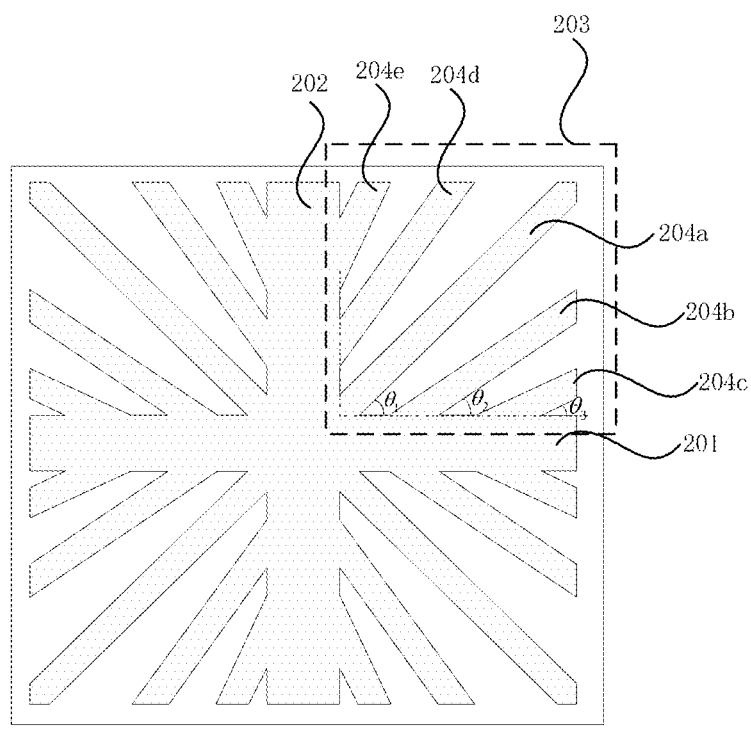
FIG. 2 schematically shows a structure of a pixel electrode according to one embodiment of the present disclosure.

FIG. 2 schematically shows an electrode structure according to the present embodiment. According to the present embodiment, the electrode structure is a pixel electrode structure. Of course, according to other embodiments of the present disclosure, the electrode structure can also be used in other reasonable electrodes of a liquid crystal display panel, and the present disclosure is not limited by this.

According to the present embodiment, the electrode structure comprises a first trunk electrode 201, a second trunk electrode 202, and a plurality of branch electrodes. The first trunk electrode 201 and the second trunk electrode 202 intersect with each other and are perpendicular to each other so as to form four domains. An intersecting point of the first trunk electrode 201 and the second trunk electrode 202 is a trunk electrode intersecting point. According to the present embodiment, a width of the first trunk electrode 201 is equal to a width of the second trunk electrode 202, and the first trunk electrode 201 and the second trunk electrode 202 both are bar-shaped electrodes with a constant width at all positions thereof.

Of course, according to other embodiments of the present disclosure, the first trunk electrode and/or the second trunk electrode can also be arranged with other reasonable structures, and the present disclosure is not limited by this. For example, according to other embodiments of the present disclosure, the width of the first trunk electrode 201 and the width of the second trunk electrode 202 can be arranged unequal to each other, and the first trunk electrode 201 and/or the second trunk electrode 202 can both be arranged as a bar-shaped electrode with a changing width.

According to the present embodiment, the branch electrodes in the four domains are arranged symmetrical about the first trunk electrode 201 and the second trunk electrode 202. Therefore, in order to facilitate the description, the electrode structure according to the present embodiment will be further illustrated hereinafter taking a first domain 203 as an example.

As shown in FIG. 2, the first domain 203 is provided with a first branch electrode 204a, a second branch electrode 204b, a third branch electrode 204c, a fourth branch electrode 204d, and a fifth branch electrode 204e. One end of each branch electrode is connected with at least one of the first trunk electrode 201 and the second trunk electrode 202 and forms a trunk-branch angle with a corresponding trunk electrode. According to the present embodiment, the trunk-branch angle is an angle formed by a branch electrode along an extending direction from one end connected with a corresponding trunk electrode to the other end far therefrom and a corresponding trunk electrode along an extending direction from the trunk electrode intersecting point to far therefrom.

According to the present embodiment, each branch electrode is a bar-shaped electrode and has a constant width at all positions thereof. Of course, according to other embodiments of the present disclosure, the branch electrode can be a bar-shaped electrode with unequal widths at different positions thereof (for example, the branch electrode can have a larger width at a middle part thereof and have a smaller width at two ends thereof), and the present disclosure is not limited by this.

The first branch electrode 204a is a central branch electrode of the first domain 203, and one end of the first branch electrode 204a is connected with both the first trunk electrode 201 and the second trunk electrode 202. That is, one end of the first branch electrode 204a is connected with the trunk electrode intersecting point. According to the present embodiment, a trunk-branch angle $\theta_1$ of the first branch electrode 204a is preferably arranged as 45°.

In order to solve the technical problem of color shift of a liquid crystal display panel under wide viewing angle, in the electrode structure according to the present embodiment, the branch electrodes are arranged with unequal distances thereamong. In the electrode structure according to the present embodiment, the trunk-branch angles of the branch electrodes decrease gradually along a direction from the trunk electrode intersecting point to far therefrom. Specifically, as shown in FIG. 2, one end of the second branch electrode 204b is connected with the first trunk electrode 201, and a trunk-branch angle $\theta_2$ of the second branch electrode 204b should be smaller than the trunk-branch angle $\theta_1$ of the first branch electrode 204a. Similarly, one end of the third branch electrode 204c is connected with the first trunk electrode 201, and a trunk-branch angle $\theta_3$ of the third branch electrode 204c should be smaller than the trunk-branch angle $\theta_2$ of the second branch electrode 204b.

According to the present embodiment, the trunk-branch angle $\theta_2$ is preferably arranged as 30°, and the trunk-branch angle $\theta_3$ is preferably arranged as 20°. It should be noted that, according to other embodiments of the present disclosure, the trunk-branch angles of the branch electrodes can also be arranged as other reasonable values, as long as it can be ensured that the trunk-branch angles of the branch electrodes decrease gradually along the direction from the trunk electrode intersecting point to far therefrom. For example, according to other embodiments of the present disclosure, the trunk-branch angle $\theta_2$ of the second branch electrode 204b can be arranged to be a reasonable value in a range from 27° to 35°, and the trunk-branch angle $\theta_3$ of the third branch electrode 204c can be arranged to be a reasonable value in a range from 15° to 23°.

One end of the fourth branch electrode 204d and one end of the fifth branch electrode 204e are both connected with the second trunk electrode 202. A trunk-branch angle $\theta_4$ of the fourth branch electrode 204d should be smaller than a complementary angle of the trunk-branch angle $\theta_1$ of the first branch electrode 204a (according to the present embodiment, since the trunk-branch angle $\theta_1$ is 45°, the complementary angle of the trunk-branch angle $\theta_1$ is also 45°). A trunk-branch angle $\theta_5$ of the fifth branch electrode 204e should be smaller than the trunk-branch angle $\theta_4$ of the fourth branch electrode 204d. According to other embodiments of the present disclosure, the trunk-branch angle $\theta_4$ and the trunk-branch angle $\theta_5$ can be arranged equal to or unequal to the trunk-branch angle $\theta_2$ and the trunk-branch angle $\theta_3$ respectively, and the present disclosure is not limited by this.

It should be noted that, according to the present embodiment, each domain is provided with 5 branch electrodes, which is only used for facilitating the description thereof. According to other embodiments of the present disclosure, a quantity of the branch electrodes contained in each domain can be configured to be other reasonable values, and the present disclosure is not limited by this.

According to the present embodiment, when a voltage is applied on the electrode structure, since in one domain, the branch electrodes are arranged with unequal distances thereamong, electric field with different strengths can be formed by the branch electrodes. Therefore, liquid crystal molecules can form different pre-tilt angles, and thus color shift of a display panel under wide viewing angle can be reduced.

Embodiment 2

Figure 3:
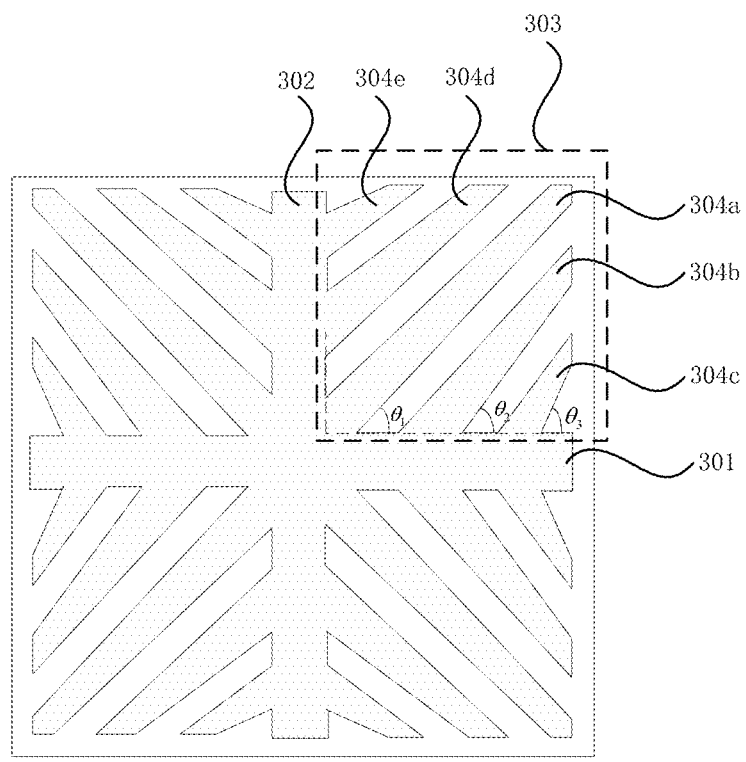
FIG. 3 schematically shows a structure of a pixel electrode according to another embodiment of the present disclosure.

FIG. 3 schematically shows an electrode structure according to the present embodiment. According to the present embodiment, the electrode structure is a pixel electrode structure. Of course, according to other embodiments of the present disclosure, the electrode structure can also be used in other reasonable electrodes of a liquid crystal display panel, and the present disclosure is not limited by this.

Similar to the electrode structure as shown in FIG. 2, according to the present embodiment, the pixel electrode structure comprises a first trunk electrode 301, a second trunk electrode 302, and a plurality of branch electrodes. The first trunk electrode 301 and the second trunk electrode 302 intersect with each other and are perpendicular to each other so as to form four domains. An intersecting point of the first trunk electrode 301 and the second trunk electrode 302 is a trunk electrode intersecting point. According to the present embodiment, the branch electrodes in the four domains are arranged symmetrical about the first trunk electrode 301 and the second trunk electrode 302. Therefore, in order to facilitate the description, the electrode structure according to the present embodiment will be further illustrated hereinafter taking a first domain 303 as an example.

As shown in FIG. 3, the first domain 303 is provided with a first branch electrode 304a, a second branch electrode 304b, a third branch electrode 304c, a fourth branch electrode 304d, and a fifth branch electrode 304e. One end of each branch electrode is connected with at least one of the first trunk electrode 301 and the second trunk electrode 302 and forms a trunk-branch angle with a corresponding trunk electrode. According to the present embodiment, the trunk-branch angle is an angle formed by a branch electrode along an extending direction from one end connected with a corresponding trunk electrode to the other end far therefrom and a corresponding trunk electrode along an extending direction from the trunk electrode intersecting point to far therefrom.

The first branch electrode 304a is a central branch electrode of the first domain 303, and one end of the first branch electrode 304a is connected with both the first trunk electrode 301 and the second trunk electrode 302. That is, one end of the first branch electrode 304a is connected with the trunk electrode intersecting point. According to the present embodiment, a trunk-branch angle $\theta_1$ of the first branch electrode 304a is preferably arranged as 45°.

In order to solve the technical problem of color shift of a liquid crystal display panel under wide viewing angle, in the electrode structure according to the present embodiment, the branch electrodes are arranged with unequal distances thereamong. In the electrode structure according to the present embodiment, the trunk-branch angles of the branch electrodes increase gradually along a direction from the trunk electrode intersecting point to far therefrom.

As shown in FIG. 3, one end of the second branch electrode 304b is connected with the first trunk electrode 301, and a trunk-branch angle $\theta_2$ of the second branch electrode 304b should be larger than the trunk-branch angle $\theta_1$ of the first branch electrode 304a. Similarly, one end of the third branch electrode 304c is connected with the first trunk electrode 301, and a trunk-branch angle $\theta_3$ of the third branch electrode 304c should be larger than the trunk-branch angle $\theta_2$ of the second branch electrode 304b. According to the present embodiment, each branch electrode is a bar-shaped electrode, and a width of each branch electrode decreases gradually along a direction from one end of the branch electrode near to the trunk electrode intersecting point to the other end far therefrom. That is, the branch electrode has a larger width at one end thereof near to the trunk electrode intersecting point, and has a smaller width at the other end thereof far from the trunk electrode intersecting point.

According to the present embodiment, the trunk-branch angle $\theta_2$ is preferably arranged as 60°, and the trunk-branch angle $\theta_3$ is preferably arranged as 70°. It should be noted that, according to other embodiments of the present disclosure, the trunk-branch angles of the branch electrodes can also be arranged as other reasonable values, as long as it can be ensured that the trunk-branch angles of the branch electrodes increase gradually along the direction from the trunk electrode intersecting point to far therefrom. For example, according to other embodiments of the present disclosure, the trunk-branch angle $\theta_2$ of the second branch electrode 304b can be arranged to be a reasonable value in a range from 55° to 62°, and the trunk-branch angle $\theta_3$ of the third branch electrode 304c can be arranged to be a reasonable value in a range from 65° to 73°.

One end of the fourth branch electrode 304d and one end of the fifth branch electrode 304e are both connected with the second trunk electrode 302. A trunk-branch angle $\theta_4$ of the fourth branch electrode 304d should be larger than a trunk-branch angle $\theta_1'$ formed by the first branch electrode 304a and the second trunk electrode 302, and a trunk-branch angle $\theta_5$ of the fifth branch electrode 304e should be larger than the trunk-branch angle $\theta_4$ of the fourth branch electrode 304d. According to other embodiments of the present disclosure, the trunk-branch angle $\theta_4$ and the trunk-branch angle $\theta_5$ can be arranged equal to or unequal to the trunk-branch angle $\theta_2$ and the trunk-branch angle $\theta_3$ respectively according to actual needs, and the present disclosure is not limited by this.

It should be noted that, according to the present embodiment, each domain is provided with 5 branch electrodes, which is only used for facilitating the description thereof. According to other embodiments of the present disclosure, a quantity of the branch electrodes contained in each domain can be configured to be other reasonable values, and the present disclosure is not limited by this.

Figure 4:
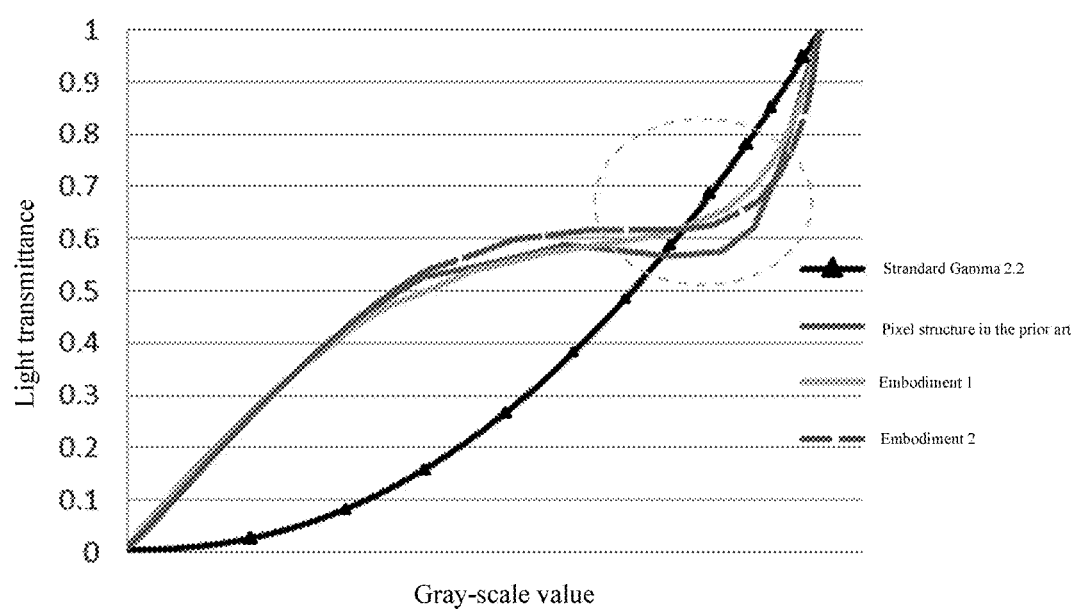
FIG. 4 schematically shows a comparative result of performance of a traditional HVA pixel electrode and pixel electrodes as shown in FIG. 2 and FIG. 3.

FIG. 4 schematically shows a comparative result of performance of a traditional pixel electrode and pixel electrode provided herein. It can be seen from FIG. 4 that, compared with the traditional pixel electrode, in the pixel electrode provided by Embodiment 1 and Embodiment 2 of the present disclosure, color shift of a liquid crystal display panel under wide viewing angle can be reduced.

The present disclosure further provides a liquid crystal display panel, which comprises the aforesaid pixel electrode structure.

It can be seen from the above description that, according to the present disclosure, the electrode structure are arranged in a manner such that the branch electrodes at different positions form different trunk-branch angles with the corresponding trunk electrode, which is different from the traditional electrode structure with four domains in which the trunk-branch angles of all branch electrodes are all arranged as 45°. In this manner, an electric field distribution in the electrode can be optimized, and an orientation of liquid crystal can be optimized accordingly. Therefore, a display performance of the liquid crystal display panel under wide viewing angle can be improved, and an aperture ratio thereof can be maintained.

It could be understood that, the embodiments disclosed herein are not limited by the specific structures disclosed herein, but incorporate the equivalent substitutes of these features which are comprehensible to those skilled in the art. It could be also understood that, the terms used herein are used for describing the specific embodiments, not for limiting them.

The phrases "one embodiment" or "embodiments" referred to herein mean that the descriptions of specific features, structures and characteristics in combination with the embodiments are included in at least one embodiment of the present disclosure. Therefore, the phrases "one embodiment" or "embodiments" appeared in different parts of the whole description do not necessarily refer to the same embodiment.

In addition, the features, structures and characteristics described herein can be combined with one another in any other suitable way in one embodiment or a plurality of embodiments. The specific details, such as quantity and angle, described herein are for providing a comprehensive understanding of the embodiments of the present disclosure. However, it is understandable for a person skilled in the art that, the present disclosure may be implemented in other ways different from the specific details specified herein, or may be implemented in other methods, components and materials. The structures, materials and operations known to all are not shown or described in the examples to avoid blurring various aspects of the present disclosure.

The embodiments are described hereinabove to interpret the principles of the present disclosure in one application or a plurality of applications. However, a person skilled in the art, without departing from the principles and thoughts of the present disclosure, can make various modifications to the forms, usages and details of the embodiments of the present disclosure without any creative work. Therefore, the protection scope of the present disclosure shall be determined by the claims.

The invention claimed is:

1. An electrode structure of a liquid crystal display panel, comprising:
    a first trunk electrode and a second trunk electrode, the first trunk electrode and the second trunk electrode intersecting with each other to form a trunk electrode intersecting point; and
    a plurality of straight branch electrodes, the branch electrodes being spaced from one another, and one end of each branch electrode being connected with at least one of the first trunk electrode and the second trunk electrode and forming a trunk-branch angle with a corresponding trunk electrode,
    wherein the trunk-branch angles of the branch electrodes decrease gradually or increase gradually along a direction from the trunk electrode intersecting point to far therefrom;
    wherein the plurality of branch electrodes comprise four central branch electrodes which are respectively arranged at four domains formed by the first trunk electrode and the second trunk electrode intersecting with each other, so that each of the four domains has only one central branch electrode;

wherein each straight central branch electrode extends from an intersection of the first trunk electrode and the second trunk electrode; and wherein the trunk-branch angle of each central branch electrode is about 45°;

wherein the trunk-branch angles of the branch electrodes increase gradually along a direction from the trunk electrode intersecting point to far therefrom;

wherein a width of each branch electrode decreases gradually along a direction from the trunk electrode intersecting point to far therefrom.

2. The electrode structure according to claim 1, wherein the first trunk electrode and/or the second trunk electrode have/has a same width at different positions thereof.

3. The electrode structure according to claim 1, wherein the branch electrodes are arranged symmetrical about the first trunk electrode and the second trunk electrode.

4. A liquid crystal display panel, comprising an electrode structure, which comprises:

a first trunk electrode and a second trunk electrode, the first trunk electrode and the second trunk electrode intersecting with each other to form a trunk electrode intersecting point; and a plurality of straight branch electrodes, the branch electrodes being spaced from one another, and one end of each branch electrode being connected with at least one of the first trunk electrode and the second trunk electrode and forming a trunk-branch angle with a corresponding trunk electrode, wherein the trunk-branch angles of the branch electrodes decrease gradually or increase gradually along a direction from the trunk electrode intersecting point to far therefrom;

wherein the plurality of branch electrodes comprise four central branch electrodes which are respectively arranged at four domains formed by the first trunk electrode and the second trunk electrode intersecting with each other, so that each of the four domains has only one central branch electrode;

wherein each straight central branch electrode extends from an intersection of the first trunk electrode and the second trunk electrode; and wherein the trunk-branch angle of each central branch electrode is about 45°;

wherein the trunk-branch angles of the branch electrodes increase gradually along a direction from the trunk electrode intersecting point to far therefrom;

a width of each branch electrode decreases gradually along a direction from the trunk electrode intersecting point to far therefrom.

5. The liquid crystal display panel according to claim 4, wherein the first trunk electrode and/or the second trunk electrode have/has a same width at different positions thereof.

6. The liquid crystal display panel according to claim 4, wherein the branch electrodes are arranged symmetrical about the first trunk electrode and the second trunk electrode.

7. The electrode structure according to claim 1, wherein the plurality of branch electrodes comprises a first branch electrode and a second branch electrode;

one end of the first branch electrode is arrange on the first trunk electrode and located next to one of the central branch electrodes in a same domain, and one end of the second branch electrode is arrange on the first trunk electrode and located next to the first branch electrode in the same domain, so that the first branch electrode is located between the second branch electrode and the one of the central branch electrodes in the same domain;

a first trunk-branch angle consists of the first branch electrode and the first trunk electrode, and a second trunk-branch angle consists of the second branch electrode and the first trunk electrode;

the first trunk-branch angle is in a range of 55° to 62°; and the second trunk-branch angle is in a range of 65° to 73°.

8. The electrode structure according to claim 4, wherein the plurality of branch electrodes comprises a first branch electrode and a second branch electrode;

one end of the first branch electrode is arrange on the first trunk electrode and located next to one of the central branch electrodes in a same domain, and one end of the second branch electrode is arrange on the first trunk electrode and located next to the first branch electrode in the same domain, so that the first branch electrode is located between the second branch electrode and the one of the central branch electrodes in the same domain;

a first trunk-branch angle consists of the first branch electrode and the first trunk electrode, and a second trunk-branch angle consists of the second branch electrode and the first trunk electrode;

the first trunk-branch angle is in a range of 55° to 62°; and the second trunk-branch angle is in a range of 65° to 73°.

* * * * *